United States Patent
DuBose

(10) Patent No.: US 6,436,562 B1
(45) Date of Patent: *Aug. 20, 2002

(54) FUEL-CELL ENGINE STREAM CONDITIONING SYSTEM

(75) Inventor: Ronald Arthur DuBose, Marietta, GA (US)

(73) Assignee: Emprise Technology Associates Corp., Marietta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/447,764

(22) Filed: Nov. 23, 1999

Related U.S. Application Data

(63) Continuation-in-part of application No. 08/900,822, filed on Jul. 25, 1997, now Pat. No. 6,013,385.

(51) Int. Cl.[7] .................................................. H01M 8/04
(52) U.S. Cl. ............................ 429/13; 429/22; 429/24; 429/25; 429/26
(58) Field of Search .......................... 165/8, 9; 96/125, 96/150, 153; 429/13, 22, 24, 25, 26

(56) References Cited

U.S. PATENT DOCUMENTS

| | | | |
|---|---|---|---|
| 3,516,867 A | | 6/1970 | Dankese |
| 3,666,007 A | * | 5/1972 | Yoshino et al. |
| 3,669,751 A | | 6/1972 | Richman |
| 3,865,924 A | * | 2/1975 | Gidaspow et al. |
| 4,012,206 A | * | 3/1977 | Macriss et al. ............ 96/125 X |
| 4,134,743 A | * | 1/1979 | Macriss et al. ............ 96/125 X |
| 4,255,171 A | * | 3/1981 | Dravnieks ................. 96/125 X |
| 5,542,968 A | * | 8/1996 | Belding et al. ............... 96/125 |
| 5,937,933 A | * | 8/1999 | Steele et al. .................... 165/8 |
| 6,013,385 A | * | 1/2000 | DuBose .................... 429/24 X |
| 6,080,227 A | * | 6/2000 | Kurosawa et al. ......... 96/125 X |
| 6,274,259 B1 | * | 8/2001 | Grasso et al. .................. 429/13 |

* cited by examiner

*Primary Examiner*—Stephen Kalafut
(74) *Attorney, Agent, or Firm*—Todd Deveau; Charles Vorndran; Troutman Sanders LLP

(57) ABSTRACT

A stream conditioning system for a fuel cell gas management system or fuel cell engine. The stream conditioning system manages species potential in at least one fuel cell reactant stream. A species transfer device is located in the path of at least one reactant stream of a fuel cell's inlet or outlet, which transfer device conditions that stream to improve the efficiency of the fuel cell. The species transfer device incorporates an exchange media and a sorbent. The fuel cell gas management system can include a cathode loop with the stream conditioning system transferring latent and sensible heat from an exhaust stream to the cathode inlet stream of the fuel cell; an anode humidity retention system for maintaining the total enthalpy of the anode stream exiting the fuel cell related to the total enthalpy of the anode inlet stream; and a cooling water management system having segregated deionized water and cooling water loops interconnected by means of a brazed plate heat exchanger.

47 Claims, 5 Drawing Sheets

FUEL-CELL ENGINE STREAM CONDITIONING SYSTEM

CROSS REFERENCE TO RELATED APPLICATIONS

This application is a continuation-in-part of U.S. Ser. No. 08/900,822 filed on Jul. 25, 1997, now U.S. Pat. No. 6,013,385.

This Invention was made with Government support under Contract No. DE-AC02-94CE50390 awarded by the Department of Energy. The Government has certain rights in this invention.

BACKGROUND OF THE INVENTION

1. Field of the Invention

The present invention relates generally to a method and apparatus for the management and control of various flow streams related to the operation of a fuel cell engine. The present invention relates more specifically to a stream conditioning system that conditions at least one fuel cell reactant stream in communication with the fuel cell of a fuel cell engine. Namely, the present system can condition the temperature and humidity of a reactant stream supplied to, or exhausted from, either the fuel cell's inlet and outlet streams, on either its anode or cathode side, or on both sides, as described in more detail below.

2. Description of Related Art

Fuel cells are electrochemical devices that convert a fuel's energy directly to electrical energy. Fuel cells operate much like continuous batteries when supplied with fuel to the anode (negative electrode) and oxidant (e.g. air) to the cathode (positive electrode). Fuel cells forego the traditional extraction of energy in the form of combustion heat, conversion of heat energy to mechanical energy (as with a turbine), and finally turning mechanical energy into electricity (e.g. using a dynamo). Instead, fuel cells chemically combine the molecules of a fuel and oxidizer without burning, dispensing with the inefficiencies and pollution of traditional combustion.

The utility of fuel cells has been known since at least as early as 1939. Further developments in the fuel cell field have included the development of proton exchange membrane (PEM) fuel cells, phosphoric acid fuel cells, alkaline fuel cells, and fuel cells incorporating reformer technology to crack hydrocarbons such as gasoline to obtain hydrogen to feed the fuel cell.

Fuel cells generally require two independent flow circuits for delivering reactant streams to the anode and the cathode of the fuel cell. In PEM fuel cells, these flow circuits include an anode circuit for feeding the fuel, generally hydrogen, to the fuel cell; and a cathode circuit for feeding the oxidant, typically air from the ambient, to the fuel cell. In order to maintain proper operating conditions for the fuel cell, the temperatures and humidities of the anode and cathode circuits must be precisely controlled to avoid drying out the electrolyte or otherwise damaging the fuel cell, and thereby stopping the flow of electricity from the fuel cell.

Fuel cells have found application in a number of fields. Stationary cells are used in the utility industry and in commercial/residential settings. An area of particular interest has been the application of fuel cell technology in electrically-powered transport vehicles, including automobiles. In automotive applications, weight and space are at a premium, and therefore, the fuel cell and its supporting systems must be as small and lightweight as possible.

Moreover, because automotive applications subject equipment to a wide and rapidly fluctuating range of operating conditions such as temperature and humidity, equipment utilized in such applications must be capable of withstanding and operating under a variety of conditions. Equipment utilized in automotive applications must also be sufficiently rugged to withstand the vibrations and stresses induced by over-the-road use.

Systems for conditioning the flow circuits of a fuel cell have been proposed. For example, U.S. Pat. No. 3,516,867 to Dankese discloses a fuel cell system including a dehumidifier and a humidifier for conditioning the fuel cell's reactant streams. The humidification portion of this system achieves moisture transfer through a partition. This type of humidification system has been found inefficient for automotive applications, mainly because of the large surface areas required to transfer the necessary quantity of moisture to the reactant streams, and because of the undesirable weight of such large-scale systems. In addition, large quantities of heat energy are consumed in vaporizing moisture in this type of humidification system, which energy consumption reduces system efficiency.

U.S. Pat. No. 3,669,751 to Richman discloses a fuel cell, hydrogen generator, and heat exchanger system, wherein reactant air to be supplied to the fuel cell is brought into evaporative contact with a wet electrolyte to humidify the reactant air. The system of Richman suffers similar disadvantages to that of Dankese; namely, the requirement of large surface areas for effecting moisture transfer and the resulting weight of system components, as well as the consumption of considerable energy in vaporizing the moisture.

In addition to cathode humidification, existing fuel cell technology requires the humidification of the hydrogen fuel stream input to the fuel cell's anode in order to prevent drying out the electrolyte within the fuel cell. This requirement of anode humidification adds additional components to a fuel cell's gas management system, resulting in undesirable increased weight and expense. Moreover, known humidification systems such as membrane humidifiers or systems utilizing airflow through beds of wetted spheres consume considerable energy in vaporizing water to provide the required humidification. Therefore, it has been found that known methods of anode humidification are unsuited to automotive applications.

Thus it can be seen that a need yet exists for a lightweight, efficient means of conditioning fuel cell reactant streams of a fuel cell engine.

Yet another need exists for a stream conditioning system for conditioning the oxidant flow to the cathode inlet of a fuel cell.

A need further exists for a method and apparatus for conditioning the anode inlet to a fuel cell, which minimizes the weight and expense of associated components.

It is to the provision of such a fuel cell engine stream conditioning system meeting these and other needs that the present invention is primarily directed.

BRIEF SUMMARY OF THE INVENTION

Briefly described, in a preferred form, the present invention is a stream conditioning system for a fuel cell gas management system or fuel cell engine. The stream conditioning system manages species potential in fuel cell reactant streams. A species transfer device is located in the path of at least one reactant stream of a fuel cell's inlet or outlet, which transfer device conditions that stream to improve the efficiency of the fuel cell. A species transfer device can also be located in the paths of both the fuel cell's inlet and outlet streams. In addition, the typical fuel cell has both an anode side and a cathode side, each side having reactant inlet and outlet streams. The conditioning system of the present invention can be used to condition a reactant stream on either the anode or cathode side, or both sides.

A reactant stream to be conditioned by the present species transfer device is defined as incorporating a potential of a species. Potential is used throughout as a term of relationship, describing the relative potential of a species between two or more streams. Potential will typically be used in context of one stream having a high potential of something (species), and another stream having a lower potential in that something (species) than the one stream, which context can be read as one stream having a higher potential of the species than does the other stream. Species is used throughout as a term describing a component of a stream that the transfer device seeks to remove from that stream, and transfer from that stream to another stream.

The present stream conditioning system communicates with at least two streams, one stream having a higher potential of a species than a lower potential stream. Yet, only one of the two streams need be in the flow path of the fuel cell; that is, only one stream need be a fuel cell reactant stream. The other of the streams can be an exhaust stream, or other such stream, provided to the conditioning system simply to enable transfer of the species from or to this other stream from or to the fuel cell reactant stream. A stream in the flow path of the fuel cell may be referred to as a reactant stream, as this stream will incorporate either a useful reactant for fuel cell operation (flowing into an inlet of the fuel cell), or will incorporate a by-product of a reactant being exhausted from the fuel cell (flowing out of an outlet of the fuel cell).

The present stream conditioning system is capable of removing a portion of a species from a high potential stream, and transferring the removed species into a low potential stream. In the context of a fuel cell engine, the stream conditioning system incorporating a species transfer device may be regarded in one sense as a removal system used to remove a portion of an unwanted species away from the engine. For example, the high potential stream can be a reactant stream in communication with the fuel cell, and the low potential stream can be an exhaust or purge stream not in communication with the fuel cell, wherein the unwanted or detrimental species is removed from the reactant stream and exhausted from the fuel cell engine via the low potential stream. Yet, even in this removal system embodiment, the species transfer device cannot simply remove the species from the reactant stream, but must then transfer the removed species to the exhaust/purge stream. Thus, when the ultimate function of the present system is that of removing a harmful species from the fuel cell engine, it still acts as a transfer system, not just a removal system.

If, on the other hand, both streams are in communication with the fuel cell, then the term "species transfer device" is a more adequate moniker, since the present system removes a portion of a wanted species from one reactant stream, and transfers it into the other reactant stream. In this context, the species is preferably kept in the fuel cell engine, to be used again, and not removed away from the engine.

The species transfer device incorporates an exchange media and a sorbent. The exchange media can be, but need not be, in the form of a wheel. A sorbent is herein defined as a substance that has the ability to take up and hold species, as by absorption or adsorption. The sorbent is chosen for its particular characteristics vis-A-vis the species to be transferred. If the species transfer device is used to transfer latent heat between streams, the sorbent can be a desiccant. If the species is CO, then the sorbent is a substance that can collect and release CO between the streams.

As an example of the present stream conditioning system, the system can be a heat transfer system for a fuel cell engine. A first stream is defined as having a higher potential of heat than a second stream, wherein it is preferable to recapture some of the heat for reuse in the fuel cell engine, rather than having the heat simply exhausted away from the engine. Therefore, the present invention would be used both to remove a portion of the heat (latent, sensible or both) from the first stream, and to transfer the heat to the second stream, via the laws of thermodynamics. In this example, heat is the species, and the two streams differ in their potential of this species, so that heat is transferred by the present invention from a high potential stream to a low potential stream. The majority of sensible heat would be transferred via the exchange media of the heat transfer device, while the latent heat would be transferred via the sorbent, in this case, a desiccant.

As the present invention is a stream conditioning system for use in connection with a fuel cell engine, at least one stream conditioned by the present invention will be an inlet or outlet reactant stream of fuel cell. The species acted upon by the present stream conditioning system will be those types of species in reactant streams of a fuel cell. The most common species are latent heat, sensible heat, air, oxygen, hydrogen, nitrogen, carbon monoxide, carbon dioxide, sulfur dioxide and methanol. Specifically, the present invention can thus condition the cathode side inlet/outlet reactant streams, the anode side inlet/outlet reactant streams, cooling inlet/outlet streams, or a combination of these streams. Primarily, the present invention is used both to capture a portion of a species from an outlet (or exhaust) stream, and to transfer it back into an inlet stream in order to recover what would typically be wasted or lost in a fuel cell engine.

In another embodiment of the present stream conditioning system, the species transfer device can be in the flow path of three or more streams. For example, in an embodiment of a fuel cell engine having a fuel cell with a cathode loop and an anode loop, the cathode and anode exhaust streams can both reject a species into a species transfer device, to be transferred into a lower potential third stream.

As described, the preferable environment of the present stream conditioning system is in combination with a fuel cell engine. A fuel cell engine can comprise a cathode loop, an anode loop, and a cooling loop, each loop in communication with a fuel cell. The present invention can condition any one, or more than one, of the streams flowing through these loops. In such a fuel cell engine, a first reactant is typically circulated through the cathode loop. The first reactant is introduced to the fuel cell through an inlet, and is removed from the fuel cell through an exhaust. Similarly, a second reactant is circulated through the anode loop. The anode reactant is introduced to the fuel cell through an inlet, and is removed from the fuel cell through an exhaust. The cooling loop can circulate deionized water through the fuel cell via a cooling water inlet and a cooling water discharge, and is used to reject heat from the fuel cell. The cooling loop can alternatively circulate other liquids or gases that can remove heat from the fuel cell.

The cathode loop can include both a compressing means for pressurizing the cathode reactant to be input to the fuel cell's cathode for use as the fuel cell's oxidant, and the present conditioning system for conditioning the pressurized cathode reactant. The compressing means, however, may not be necessary in all circumstances.

The present species transfer device used in connection with the cathode loop can be in the embodiment of a sensible and latent heat transfer device. The sensible and latent heat transfer device transfers sensible and/or latent heat from the cathode reactant's inlet or outlet stream to the reactant's other of the inlet or outlet stream. The direction of transfer of these species, sensible and latent heat will, as described above, depend on which stream has a higher potential of sensible and/or latent heat. "And/or" is used here because it is possible that the present system may transfer one such species from a reactant's inlet stream to a reactant's outlet stream, while concurrently transferring another such species from the outlet stream to the inlet stream. For example, a fuel cell cathode reactant inlet stream may have a lower potential of latent heat and a higher potential of sensible heat than those of the cathode reactant outlet stream. As such, the sensible and latent heat transfer device embodiment of the present invention would transfer a portion of the cathode reactant outlet stream's latent heat to the cathode reactant inlet stream, and would transfer a portion of the cathode reactant inlet stream's sensible heat to the cathode reactant outlet stream.

If the cathode loop of the fuel cell engine further incorporates a turbo charger, the sensible and latent heat transfer device of the present system can operate to transfer each of these two species in opposite directions, as described above. The sensible heat transferred from the inlet to the exhaust, and the latent heat transferred from the exhaust to the inlet.

This sensible and latent heat transfer device embodiment of the present stream conditioning system can include an exchange media in the form of an enthalpy wheel, and the sorbent in the form of a desiccant. Depending on stream potentials, the enthalpy wheel can operate by removing both sensible and latent heat from the fuel cell cathode reactant exhaust stream to heat and humidify the cathode reactant inlet stream. Because the water vapor adsorbed from the cathode reactant exhaust is desorbed into the cathode reactant inlet stream, it is unnecessary to provide external energy (in the form of heat of vaporization) in transferring moisture removed from the cathode reactant exhaust to the cathode reactant inlet by the enthalpy wheel.

The desiccant of the sensible and latent heat transfer device is capable of removing moisture through adsorption from the cathode reactant exhaust stream, which removal releases heat and raises the exhaust stream temperature, which in turn heats the media of the enthalpy wheel. This same heat is used to power the desorbtion phase in the cathode reactant inlet stream upon rotation of the enthalpy wheel. A desiccant material naturally attracts moisture from gases and liquids. The material becomes saturated as moisture is adsorbed or collects on the surface; but when exposed to a dryer stream, the desiccant gives up its moisture—or regenerates—and can be used again. The enthalpy wheel of the present invention can include solid desiccants, for example, silica gel, activated alumina, lithium chloride salt, and molecular sieves. Titanium silicate, a class of material called Im, and synthetic polymers are newer solid desiccant materials designed to be more effective for cooling applications. Alternatively, the enthalpy wheel can include liquid desiccants, for example, lithium chloride, lithium bromide, calcium chloride, and triethylene glycol solutions.

Although the enthalpy wheel embodiment is preferred, the species transfer device can alternatively comprise two or more beds or towers of sorbent material, operated by means of continuous sequential valving, to alternate between a charging mode whereby a fuel cell exhaust stream heats and humidifies a desiccant, and a discharging mode whereby the heat and humidity collected by the desiccant beds or towers are released into the cathode inlet stream.

As the present stream conditioning system is provided to transfer a species from a stream with a high potential of that species to a stream with a lower potential of that species, at least one stream being in communication with a fuel cell, the size of the pores in the exchange media of the wheel can be varied, and the sorbent of the transfer device can be chosen to selectively filter out different types of species. For example, in an enthalpy wheel used in connection with the cathode loop of the fuel cell engine, the sorbent can be a desiccant to transfer moisture from the exhaust stream to the inlet stream. Alternatively, the sorbent can be sized to filter nitrogen and other species of the cathode reactant inlet stream, thereby increasing the partial pressure of oxygen in the inlet stream to increase fuel cell efficiency. Further, two or more enthalpy wheels can be provided in series, each of which having pores sizes to selectively filter various species from the cathode inlet and/or exhaust streams. In yet another embodiment, a single enthalpy wheel can incorporate more than one sorbent, each sorbent capable of filtering a different species.

The cathode loop of the fuel cell engine can further comprise an adiabatic quench to cool the cathode reactant inlet stream. The adiabatic quench controls the dry bulb temperature of the inlet stream by vaporization of quench water into the inlet stream, either prior to its introduction to a sensible and latent heat transfer device, or, alternatively, upon its exit from a heat transfer device. The adiabatic quench can comprise collecting means for collecting liquid from the cathode exhaust stream, transfer means for transporting the collected liquid to the point of introduction to the cathode inlet stream, and an introducing means to introduce the collected liquid into the cathode reactant inlet stream. The introducing means can comprise an ultrasonic nozzle for dispersing the liquid, in a mist of fine droplets, into the inlet stream.

In such an engine, the quench rate at the cathode inlet controls the dry bulb temperature of the cathode reactant inlet stream, while the speed of the enthalpy wheel controls the dew point temperature, and thus the relative humidity, of the inlet stream. By varying the speed of the rotation of the enthalpy wheel, the amount of moisture transferred to the cathode inlet can be varied. Temperature, pressure, and relative humidity sensors can be provided to monitor the cathode inlet stream conditions and provide feedback control, through a computerized control system, for the adiabatic quench rate and the rotational speed of the enthalpy wheel.

In some cases, what would normally be the cathode reactant inlet and outlet streams are instead sent to the anode side of a fuel cell. The species transfer device for the cathode reactant inlet and outlet described above is equally applicable to the case where such reactant is sent instead to the anode side.

An anode loop of a PEM fuel cell engine can comprise one or more eductors or other means for recirculating the anode reactant exhaust stream to the anode inlet. By mixing the anode exhaust with supply hydrogen from storage tanks, the cool, dry hydrogen from the tanks is humidified by an approximately equal amount of moist exhaust hydrogen from the fuel cell. The fuel cell operating conditions are controlled to provide an excess of hydrogen (preferably at a stoichiometric ratio of approximately 2.0) to the anode inlet stream, and to control the temperature of the anode inlet hydrogen stream. In this manner, the total enthalpy of the anode exhaust stream is controlled in relation to the inlet total enthalpy, thereby, in effect, utilizing surplus hydrogen to transport anode humidity through the fuel cell, back to the anode inlet stream and preventing moisture from condensing out of the anode reactant stream in the fuel cell. In this manner, the need for an anode humidifier and its associated equipment is eliminated, thereby reducing weight, expense and occupied space. The anode loop also functions to maintain the anode pressure at or near that of the cathode in order to minimize the possibility of blowing out the cell's membranes.

The anode loop can further comprise another embodiment of the present stream conditioning system, a contaminant sweep. The contaminant sweep is another type of species transfer device, for example, a CO sweep, which helps remove CO from the anode reactant to a PEM fuel cell engine, as CO is bad for certain catalysts in the fuel cell, including platinum. Thus, in this embodiment, the present stream conditioning system can comprise an exchange media with a sorbent that is sized to remove CO from the anode reactant. Here, the system is not so much interested in transferring the CO between anode inlet and outlet streams, but in removing CO from the anode loop. Yet, the exchange media with a sorbent can only remove a species if it can move it from a high potential stream to a low potential stream. So, in effect, the present system can remove CO from the anode reactant stream if it can transfer it to another stream having a lower potential or concentration of CO.

Other contaminant sweep embodiments of the present invention can be located along any loop of the fuel cell engine, and can include, without limitation, a methanol sweep in the cathode loop to capture fugitive methanol from a direct methanol fuel cell engine, a nitrogen sweep to capture nitrogen from the cathode inlet stream, and a reformer product gas sweep to capture $CO_2$ from the reformer outlet in a fuel cell engine incorporating a reformer. It will be understood that while the fuel cell engine can incorporate a methanol sweep to transfer methanol away from the engine and into, for example, the atmosphere, the preferable methanol sweep would be better termed a methanol catalyzer, described hereinafter.

The fuel cell, sometimes also referred to as a "stack," is cooled by circulating deionized water through the stack by the cooling water loop. Deionized water is an aggressive corrosive agent and, therefore, stainless steel piping and equipment must be utilized in handling this deionized water. Because stainless steel is a poor thermal conductor, and is heavy and expensive, use of a stainless radiator to effect water-to-air heat transfer has been found to be undesirable, especially in automotive applications. Therefore, the fuel cell engine can utilize a stainless brazed plate heat exchanger to effect liquid-to-liquid transfer of stack heat, from a closed deionized water circuit to an ordinary ethylene glycol and water cooling stream. Then, a standard commercial automotive radiator system can be utilized for water-to-air heat transfer from the glycol/water stream. In this manner, heat from the deionized water is transferred by water-to-water convection through the brazed plate heat exchanger's thin stainless plates, at a much higher heat transfer rate than could be obtained through stainless steel-to-air heat exchange by a stainless radiator. This aspect of the fuel cell engine enables the use of a more efficient, lighter, cheaper, aluminum water-to-air automotive radiator, and minimizes the quantity of deionized water required. The use of a more efficient aluminum radiator also reduces the required surface area for effecting heat transfer, thereby minimizing aerodynamic drag associated with the radiator.

The present stream conditioning system preferably is used with fuel cell engines related to both transportation (mobile) and stationary applications. The fuel cells used in connection with such applications are generally PEM fuel cells. Yet, it will be understood that the present stream conditioning system can be used in connection with other fuel cell types, including phosphoric acid, carbonate and solid oxide that, instead of the ion exchange membrane of the PEM, use phosphoric acid, alkali carbonate mixtures and yttria stabilized zirconia, respectfully, as the electrolyte.

The conditioning system of the present invention can be used in connection with reactant streams of PEM fuel cells that are direct methanol fuel cells (DMFCs). A DMFC can use a liquid methanol fuel feed, which eliminates the complexity and weight penalties of a reformer generally used in a fuel cell engine. DMFCs are a relatively new member of the fuel cell family. These cells are similar to the PEM cells in that they both use a polymer membrane as the electrolyte. However, in the DMFC, the anode catalyst itself draws the hydrogen from the liquid methanol, eliminating the need for a fuel reformer. Efficiencies of about 40% are expected with this type of fuel cell, which would typically operate at a temperature between 120–190 degrees F. Higher efficiencies are achieved at higher temperatures.

For example, a stream conditioning system of the present invention used in connection with a DMFC engine can be a methanol catalyzer to catalyze fugitive methanol on the cathode side of the DMFC that migrates through the fuel cell from the anode side. The present system can convert the methanol to heat via a catalyst, and transfer the heat back into the cathode inlet stream. A catalyst can be included in the enthalpy wheel in the cathode loop to catch the fugitive methanol. The catalyst can be mixed with the sorbent. The fugitive methanol is catalyzed by the enthalpy wheel, generating heat that is reused. Unlike cracking the methanol with a catalytic converter that wastes the heat of cracking, use of the methanol sweep embodiment of the present system recirculates that heat, producing a more efficient DMFC engine. Using an enthalpy wheel embodiment of the present invention is particularly advantageous in a DMFC as the cell temperature must be fairly high to crack the methanol.

The fuel cell engine in which the present stream conditioning system operates can be a low pressure fuel cell engine embodiment, wherein the cathode loop can further comprise a pre-heater to add heat to the cathode reactant stream, which pre-heater can replace the adiabatic quench, as in this low pressure fuel cell engine embodiment, there is little to no heat of compression to remove from the cathode reactant stream. Conversely, in a high pressure fuel cell engine embodiment, if the compressing means provides a compression ratio of, for example, greater than or equal to 3:1, then the cathode loop can incorporate the adiabatic quench that alone acts as a conversion device, converting sensible heat to latent heat, without need to resort to an enthalpy wheel of the present invention, as the quench water is enough to humidify the cathode reactant stream.

Accordingly, it is an object of the present invention to provide a stream conditioning system for conditioning at least one reactant stream of a fuel cell, which system is compact, lightweight and inexpensive.

Another object of the present invention is to provide a stream conditioning system that enables cathode air humidification and anode hydrogen humidity retention for a fuel cell engine.

A further object of the present invention is to provide a method and apparatus for transferring sensible and latent heat from the fuel cell's cathode exhaust stream to the cathode inlet stream.

Yet another object of the present invention is to provide a method and apparatus for retaining humidity within the hydrogen fuel stream supplied to the anode inlet of a fuel cell.

These and other objects, features, and advantages of the present invention will become more apparent upon reading the following specification in conjunction with the accompanying drawing figures.

DETAILED DESCRIPTION OF A PREFERRED EMBODIMENT

Figure 1:
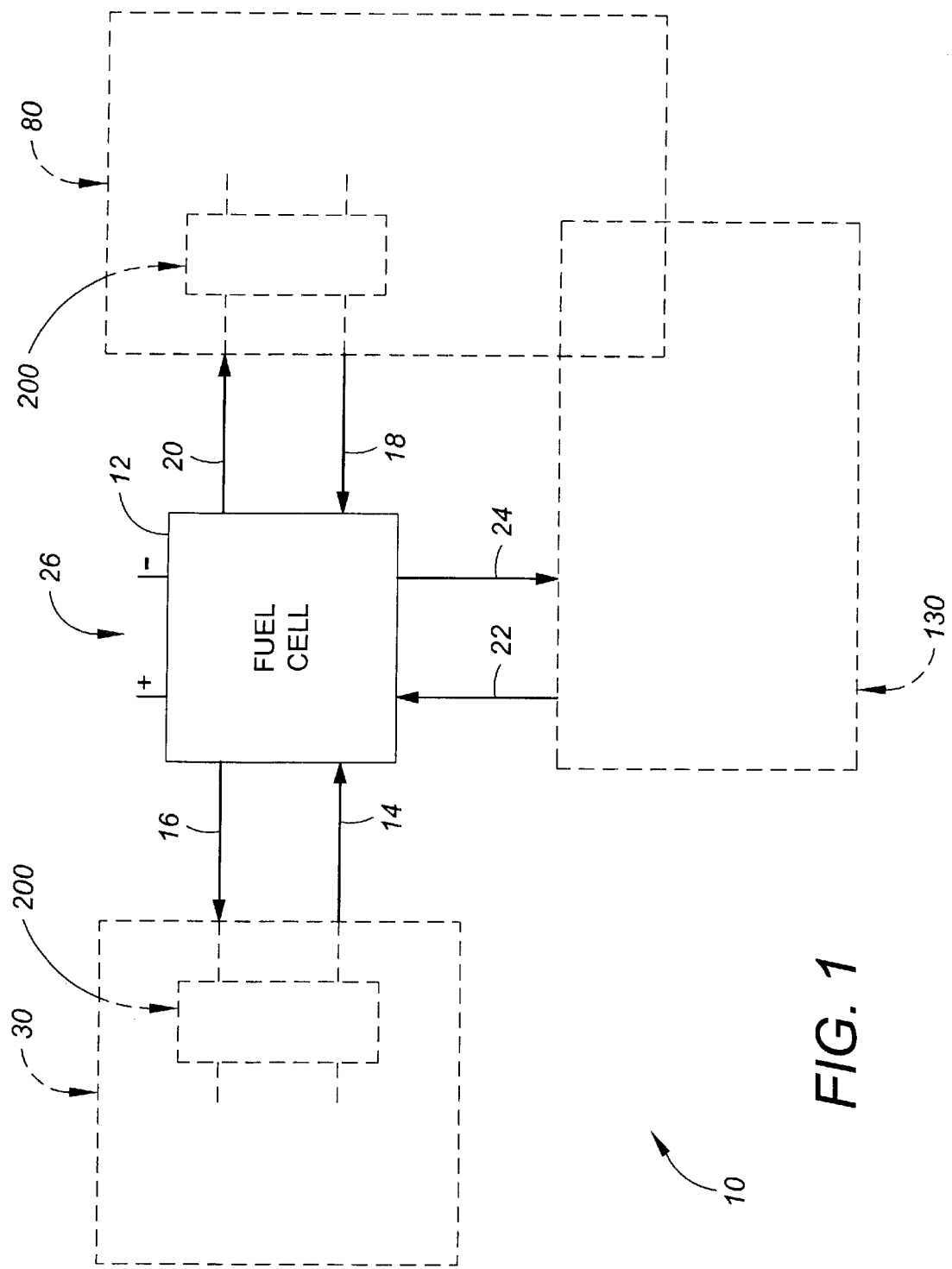
FIG. 1 is a schematic diagram showing the typical environment of the present stream conditioning system, that being a fuel cell engine or gas management system.

Referring now in detail to the drawing figures wherein like reference numerals represent like parts throughout the several views, the present invention 200 is described in the context of a preferred embodiment, namely, a system for the management and control of various flow streams related to the operation of a fuel cell engine having a fuel cell 12. This system conditions at least one stream in communication with a fuel cell. A preferred fuel cell gas management system 10 having a fuel cell is illustrated in FIG. 1. As described above, this is only one of a number of embodiments of the present invention.

The gas management system 10 of FIG. 1 comprises a cathode humidification system 30, an anode humidity retention system 80, and a cooling water processing system 130, all connected to the fuel cell 12. The fuel cell 12 generally comprises a cathode inlet 14, a cathode exhaust 16, an anode inlet 18, an anode exhaust 20, a cooling water inlet 22 and a cooling water discharge 24. Electricity generated by the fuel cell 12 is conducted to a load (unshown) by conductors 26. The fuel cell 12 can be used to supply electrical power for a variety of applications. For example, the fuel cell 12 can be used to recharge the batteries of an electric automobile, or can be used as a power source for commercial or household electrical service.

The present stream conditioning system 200 is representatively shown bridging fuel cell's cathode inlet and exhaust 14, 16 in the cathode humidification system 30. It will be understood that the conditioning system 200 need only communicate with one of the fuel cell's inlets and outlets. While the present stream conditioning system 200 must interrupt at least two streams, one having a higher potential of a species than the other in order to transfer a portion of the species from the higher potential stream to the lower potential stream, one of the system's streams can be independent from the fuel cell 12.

The fuel cell 12 of the gas management system 10 operates according to known methods, and may be any of a number of known fuel cell varieties. The present stream conditioning system 200 can manage species transfer in fuel cell streams of fuel cell's that operate in a wide range of pressures, such as low pressure fuel cells and high pressure fuel cells. In the disclosed preferred embodiment, the fuel cell 12 of the gas management system 10 will be described as a proton exchange membrane (PEM) fuel cell. However, the present invention is not so limited, and may be applied to the reactant streams of other types of fuel cells as well. In a typical proton exchange membrane fuel cell, a first reactant stream of the cathode system 30 is air supplied to the cathode inlet 14 of the fuel cell 12 for use as the fuel cell's oxidant. A second reactant stream of the anode system 80 is hydrogen supplied to the fuel cell's anode inlet 18, for use as the fuel. It will be understood that some fuel cell types result in the oxidant being sent to the anode system 80, and the fuel to the cathode system 30, which reversal does not affect the applicability of the present conditioning system.

The stream conditioning system of the present invention is described below in relation to the gas management system 10 illustrated in FIG. 1.

A Stream Conditioning System In Cooperation With A Cathode Humidification System Because the fuel cell 12 operates best at elevated temperatures, it has been found desirable to heat and humidify the first reactant stream supplied to the cathode inlet 14 in order to prevent the cathode air stream from drying out the electrolyte in the fuel cell. Thus, the preferred embodiment of the present conditioning system is as a species transfer device conditioning the first reactant with the species being sensible and latent heat.

Figure 2:
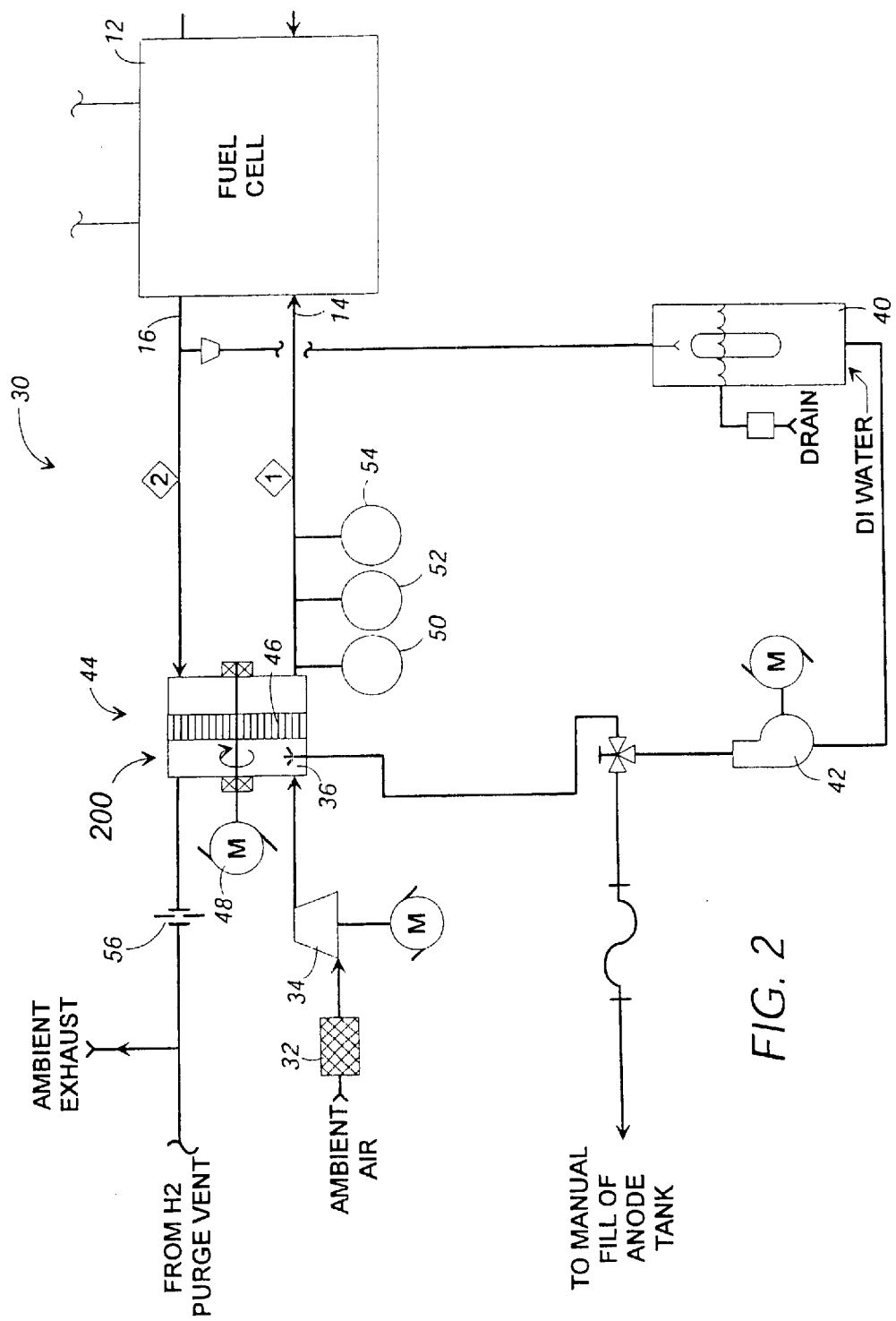
FIG. 2 is a schematic diagram showing a preferred form of the cathode humidification system of the fuel cell engine in greater detail.
Figure 4:
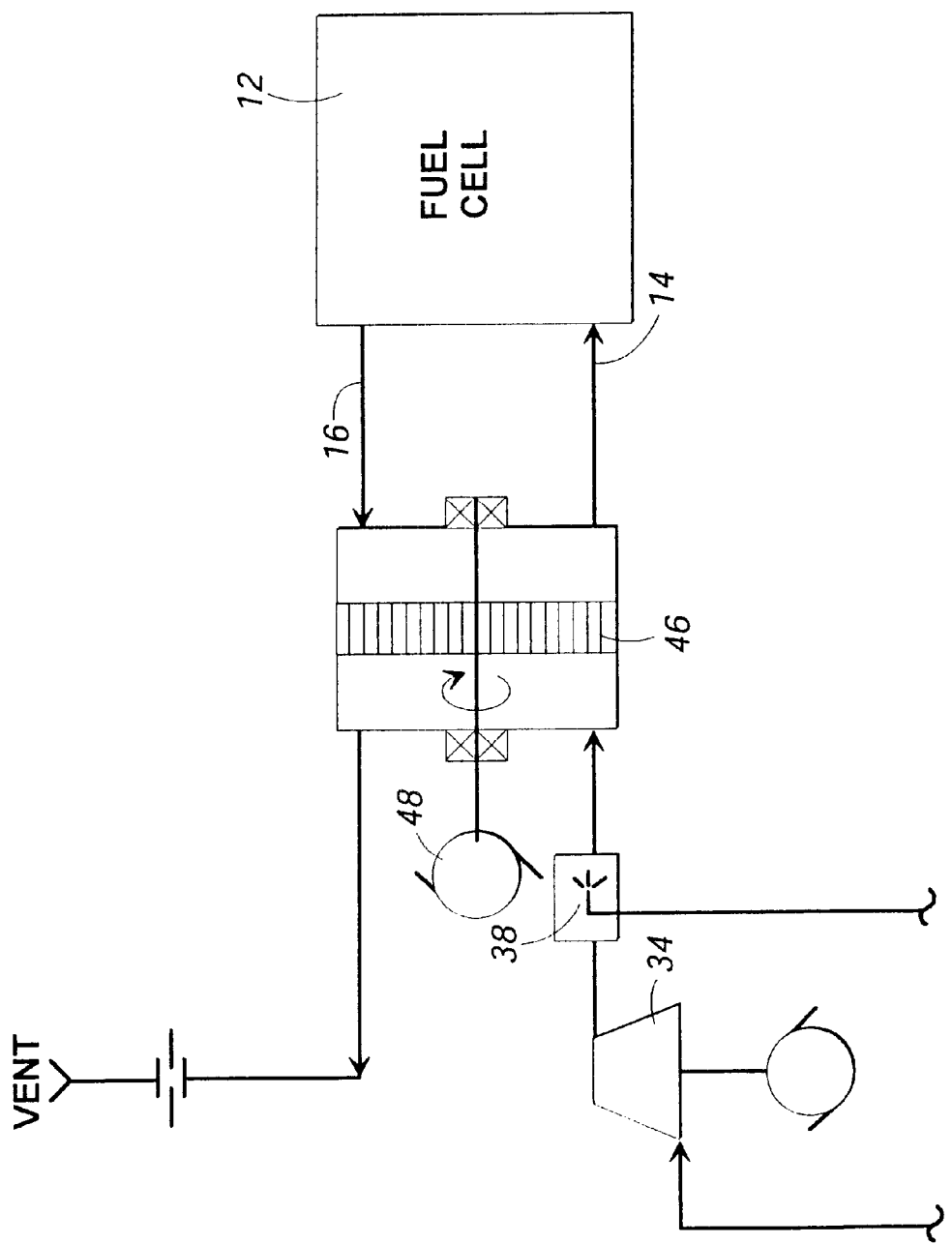
FIG. 4 is a schematic diagram showing the cathode humidification system of FIG. 1 in greater detail.

The cathode humidification system 30 of gas management system 10 is shown in greater detail by FIGS. 2 and 4. Ambient air is drawn through a filtering means 32, such as a commercially available automotive air filter, and into a pressurization means 34. The pressurization means 34 is preferably a motor driven compressor, and preferably compresses the inlet air to approximately 2 atmospheres. It will be understood by those of ordinary skill in the art that the pressurization means 32 can pressurize the inlet air through a range of pressures above ambient pressure. An electrically-powered, twin-screw compressor, such as the motorcycle supercharger manufactured by Opcon Autorotor AB of Nacka, Sweden has been found to provide acceptable performance as the pressurization means 34.

The air stream exiting the pressurization means 34 is typically at an elevated dry bulb temperature. The preferred operating conditions of the fuel cell 12 require the inlet air supplied to the cathode inlet 14 to be at 70° C. dewpoint and 75° C. dry bulb. Thus, it is necessary to introduce humidity to the inlet air stream and to reduce its dry bulb temperature. One way to reduce the dry bulb temperature and, to a minor extent, begin humidification of the cathode inlet air stream, is through the use of a carefully controlled adiabatic quench 36. The adiabatic quench 36 can comprise an ultrasonic nozzle 38 that supplies a fine mist of quench water to the compressed air from a cathode water reservoir 40 by means of a quench water metering pump 42. The heat of vaporization consumed in evaporating the quench water reduces the dry bulb temperature of the air. By controlling the metering pump 42, the rate of quench water supplied to the air stream, and thus, the amount of dry bulb cooling is controlled. Liquid water collected from the cathode exhaust 16 can be collected in the reservoir 40 for use in the quench stage.

After the quench phase, the cooled compressed air is introduced to the stream conditioning system 200 of the present invention. In this preferred embodiment, system 200 incorporates a species transfer device 44 in the form of an enthalpy transfer device for transferring sensible and latent heat tom the cathode exhaust stream to the cathode inlet stream. Thus, the cathode exhaust stream can be defined as the high potential stream regarding the species sensible and latent heat. The cathode inlet stream can, conversely, be defined as the low potential stream.

The enthalpy transfer device 44 preferably comprises a rotationally driven enthalpy wheel 46 incorporating an exchange media and a sorbent. The exchange media can be a porous material, for example, a structure of acrylic fiber or other material which is resistant to attack by deionized water. The sorbent can coat the exchange media, and in this embodiment be a water selective molecular sieve in the form of a desiccant. In preferred form, the desiccant is a zeolite.

Zeolites are highly crystalline alumino-silicate frameworks comprising $[SiO_4]^{4-}$ and $[AlO_4]^{5-}$ tetrahedral units. T atoms (Si, Al) are joined by an oxygen bridges. Introduction of an overall negative surface charge requires counter ions e.g. $Na^+$, $K^+$ and $Ca^{2+}$. The zeolite crystals contain water, and as the water is driven off by heating, there is no discernible collapse of the framework structure. This leads to a highly crystalline, microporous adsorbent that has an internal structure which can be easily tailored to adsorb any number of species.

Zeolites have beneficial molecular sieving properties. The pore size distribution can be modified, enabling the zeolite to be used as a so-called molecular sieve. Molecules which are too large to diffuse into the pores are excluded, whereas molecules which have a kinetic diameter smaller than the pore size, diffuse into the pores, adsorb and under certain conditions are capable of undergoing catalytic reactions. An example of this is in the sieving of straight and branched chained hydrocarbons to increase the octane number of gasoline.

The zeolite framework consists of Si and Al atoms connected by oxygen bridges. Introduction of Al atoms into the framework produces a charge imbalance due to the difference in valance of Si and Al. This charge imbalance is countered by the introduction of cations (e.g. calcium, sodium ). The introduction of Al into the framework has several effects:

i. introduction of an electric field—makes the zeolite more hydrophilic;
ii. introduction of catalytic centers;
iii. introduction of ion-exchange properties; and
iv. lowers the thermal stability of the zeolite.

Zeolites also have beneficial ion-exchange properties. As mentioned above, the introduction of Al into the zeolite framework produces ion-exchange properties. Ions in solution can be exchanged for ions within the zeolite framework. These ions can be univalent, divalent or even tri-valent in nature.

The mass of the wheel 46 transports sensible heat, while the desiccant traps and transfers water vapor molecules and, thereby, latent heat. Synthetic fiber-based energy conservation wheels provided by Novel Aire and Englehard Hexcore, LP. have been found to provide acceptable heat transfer performance, and to resist attack by deionized water.

A variable speed electric motor 48 is preferably provided for driving the enthalpy wheel 46. Saturated exhaust air from the cathode discharge 16 is routed through a first side of the enthalpy wheel 46, where sensible and latent heat are collected by the enthalpy wheel as the exhaust air passes therethrough. As the enthalpy wheel rotates, this sensible and latent heat is released into the supply air stream being supplied to the cathode inlet 14. By controlling the rate of rotation of the enthalpy wheel 46, the rate of heat transfer, and thus the relative humidity (and wet bulb temperature) is controlled.

Sensors such as a relative humidity sensor 50, a temperature sensor 52 and a pressure sensor 54 are preferably provided for monitoring the conditions of the air discharged from the enthalpy transfer device 44 into the fuel cell cathode inlet 14. By means of an unshown computer feedback control system, the dry bulb temperature and relative humidity of the cathode inlet air stream can be controlled by selectively adjusting the quench rate and/or the speed of rotation of the enthalpy wheel 46.

A throttling valve or orifice fitting 56 is preferably provided in the cathode exhaust conduit after the enthalpy transfer device 44, for maintaining the operating pressure in the cathode air stream. Any liquid water condensed in the stack is collected and drained to the cathode water reservoir 40 for use by the quench pump, and for periodic manual or automatic anode replenishment.

Although an enthalpy wheel 46 is the preferred species transfer device, other transfer devices are contemplated. For example, two or more beds or towers of zeolites can be operated, by means of continuous sequential valving, to alternate between a charging mode hereby fuel cell exhaust air heats and humidifies a zeolite, and a discharging mode whereby the heat and humidity trapped in the zeolite beds or towers is released into the cathode supply air. The use of an enthalpy wheel, however, has been found to provide very good performance and to minimize space and weight requirements.

The pore size of the sorbent(s) of the enthalpy wheel 46 can be chosen to selectively entrap or filter one or more species from the inlet or exhaust streams. Alternatively, additional wheels can be installed in the path of the stream(s), for selective filtering more than one species. In this manner, for example, by selectively filtering nitrogen from the anode inlet stream with a nitrogen transfer device (or nitrogen sweep) of the present invention, the partial pressure of oxygen in the cathode inlet stream can be increased, thereby providing more efficient fuel cell operation.

Figure 5:
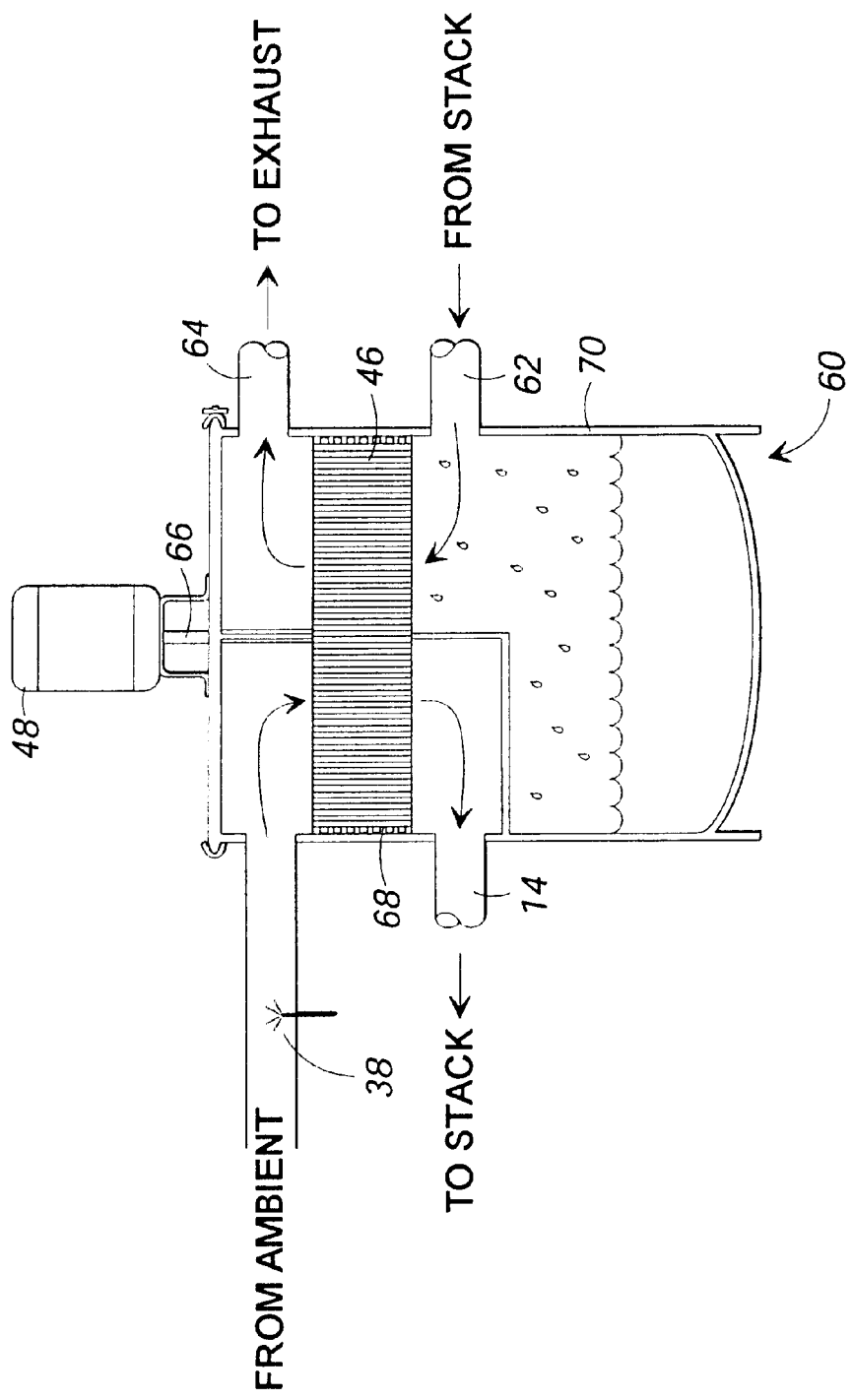
FIG. 5 shows a preferred form of the cathode humidifier portion of the cathode humidification system of FIG. 2.

The cathode humidification system components, including the enthalpy wheel 46, the cathode water reservoir 40, the metering pump 42 and the ultrasonic nozzle 38 can be physically combined to provide a compact cathode humidifier 60, as shown in greater detail by FIG. 5. As depicted, the enthalpy wheel 46 is horizontally mounted directly above the water reservoir 40. The fuel cell exhaust enters the cathode humidifier 60 at an exhaust inlet manifold 62, and exits the cathode humidifier at an exhaust outlet manifold 64. The saturated exhaust air passes upward through the enthalpy wheel 46 and condensed liquid is collected below the enthalpy wheel 46 for use by the quench pump. A labyrinth seal 68 can be provided between the enthalpy wheel and the housing 70 of the humidifier 60. The gear motor 48 is mounted to the top of the cathode humidifier and connects to the enthalpy wheel 46 through a drive shaft 66.

In a low pressure fuel cell engine embodiment of the gas management system 10, the cathode humidification system 30 can further comprise a pre-heater (not shown) to add heat to the cathode reactant stream, which pre-heater can replace the adiabatic quench 367 as in the low pressure fuel cell embodiment, there is little to no heat of compression to remove from the first reactant stream. In a high pressure fuel cell engine embodiment, if the compressing means 34 provides a compression ratio of, for example, greater than or equal to 3:1, then the cathode humidification system 30 preferably incorporates the adiabatic quench 36.

Figure 3:
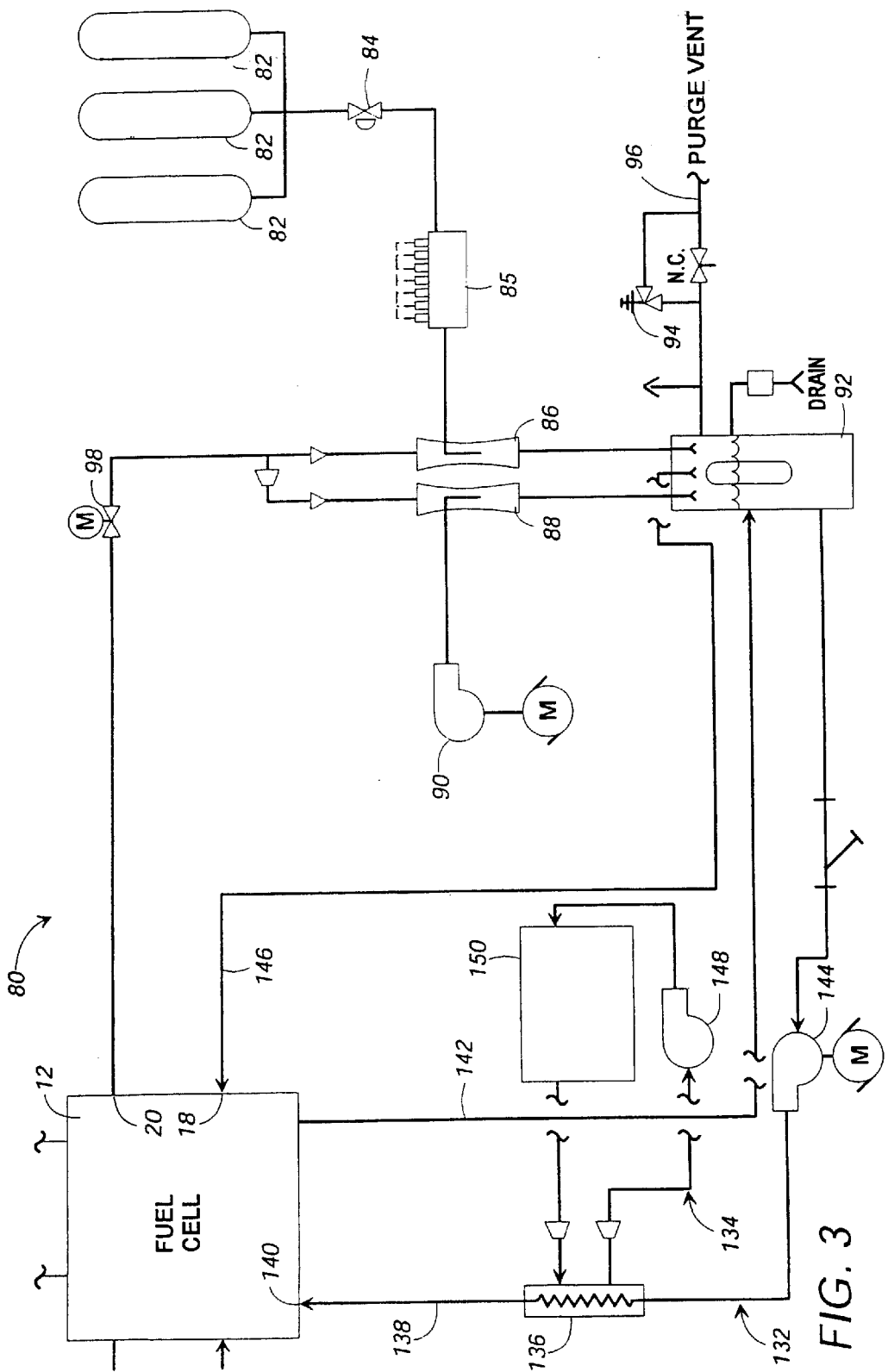
FIG. 3 is a schematic diagram showing a preferred form of the anode humidity retention system and the cooling water processing system of the fuel cell engine in greater detail.

A Stream Conditioning System In Cooperation With An Anode Humidity Retention System FIG. 3 shows schematically the anode humidity retention system 80 of the gas management system 10. Hydrogen gas used as the fuel in a PEM fuel cell is preferably stored in one or more high pressure storage means such as tanks 82. A regulating means such as a high pressure solenoid operated reducing valve 84, reduces the pressure of the supplied hydrogen from tanks 82 to a usable level. A computer-controlled digital regulator valve 85 is preferably provided for regulating the hydrogen inlet flow to the fuel cell from the tanks 84.

In order to efficiently utilize the hydrogen supplied to the fuel cell 12, it has been found desirable to recirculate the excess hydrogen exhausted from the anode exhaust 20 of the fuel cell 12 back to the fuel cell's anode inlet. However, because of hydrogen's small molecular size, it is difficult to pump and contain hydrogen by standard compressors or by pumps having rotating shafts and mechanical seals. Accordingly, one or more eductors can be used to recirculate hydrogen through the anode loop. These eductors incorporate a converging-diverging nozzle and an injection port for injecting a high velocity flow adjacent the nozzle's point of contraction, for inducing a flow in the recirculated hydrogen. A first or "running" eductor 86, powered by the injection of high pressure hydrogen from the storage tanks, serves to recirculate the hydrogen when the fuel cell is operating in standard operating mode. The use of eductors, rather than pumps, eliminates the presence of moving parts in the hydrogen loop, which could create sparks and result in an explosion.

In order to provide sufficient motive force to recirculate the hydrogen, however, it is necessary that the running eductor 86 receive a sufficient flow of high pressure hydrogen from the storage tanks. At normal running conditions, the fuel cell consumes an amount of hydrogen sufficient to allow the running eductor 86 to circulate hydrogen fuel through the anode loop. However, during start up, little or no hydrogen is consumed by the fuel cell, and the running eductor 86 provides insufficient recirculation. Therefore, the anode humidity retention system of the fuel cell engine preferably further comprises a second or "start-up" eductor 88. The start-up eductor 88 is powered by injection of water or other driving fluid, which is preferably supplied by an electric motor driven start-up pump 90, which provides the motive flow and begins circulating and humidifying the anode loop. As the fuel cell begins consumption of hydrogen fuel, high pressure hydrogen from the tanks 82 begins to be drawn through the running eductor 86. Generally, a high-velocity stream of second reactant, here described as the velocity of the high-pressure hydrogen from the tanks 82, travels at a velocity typically in excess of mach 1. Both eductors 86, 88 then operate in parallel, until operating conditions are achieved. At such time, the start-up eductor 88 may be shut down, and the running eductor 86 then takes over the recirculation of the anode loop. The recirculation of hydrogen in the anode loop during start-up is desirable, as venting the hydrogen during start-up can result in undesirable accumulation of explosive hydrogen.

Recirculated hydrogen exhausted from the stack mixes with the fresh, high-pressure hydrogen from the tanks 82 in the running eductor 86, and is discharged to the anode reservoir 92, where any liquid water entrained in the hydrogen flow is collected. Also, the high vapor pressure of the stack cooling water within the anode reservoir 92 serves to buffer the humidity of the hydrogen stream. The anode reservoir 92 is preferably fitted with a relief valve 94 to protect against excessive pressurization, and with a timed computer control purge vent 96 which periodically purges the anode circuit to eliminate any accumulation of inert gas or air in the anode which could lead to an explosive condition.

Due to the constant recycling of the hydrogen loop, air which may leak through the fuel cell from the cathode side may accumulate and develop an explosive atmosphere in the anode hydrogen loop. Therefore, it is necessary to periodically vent a portion of the hydrogen from the anode loop through the purge vent 96 to the atmosphere. Purge vent 96 can be computer controlled to allow venting only at safe conditions, such as when a fuel cell powered vehicle is operating at a sufficient rate of speed to safely disperse the vented hydrogen.

Hydrogen fuel flows from the anode reservoir 92 to the fuel cell's anode inlet 18. Hydrogen which is not consumed in the fuel cell 12 is then exhausted through the anode discharge 20, and is recirculated through the eductors 86, 88, as described above. The stoichiometric ratio of hydrogen fuel supplied to the anode of the fuel cell 12 is controlled by a damper 98 in the anode discharge conduit 20. Under standard running conditions, fresh hydrogen from the tanks 82 is introduced through the eductors in an approximately equal ratio to the recirculated hydrogen from the anode discharge 20.

It has been discovered that the necessity for anode humidification (and the resulting necessity for humidification equipment) can be eliminated by adjusting the inlet hydrogen temperature and stoichiometric ratio to maintain the total enthalpy of the exhaust stream of hydrogen from the fuel cell equal to the total enthalpy of the inlet stream of hydrogen to the fuel cell. For example, it has been found that under the following anode fuel conditions, the enthalpy of the exhaust hydrogen is equal to the enthalpy of the inlet hydrogen and, therefore, the recirculated hydrogen carries enough sensible and latent heat to mix with the fresh hydrogen from the tanks 82 and maintain the desired anode inlet conditions:

| Recirculated Anode Exhaust | Fresh $H_2$ From Tanks | Mixture to Anode |
| --- | --- | --- |
| 0.08 lb/min | 0.08 lb/min | 0.16 lb/min |
| 83.4° C. db | 25° C. db | 70° C. db |
| 100% RH | 0% RH | 100% RH |
| (113 gr/min. $H_2O$) | (0 gr/min. $H_2O$) | (113 gr/min. $H_2O$) |
| Q = +2.6 kW | Q = −2.6 kW | Q = 0.0 |

At these conditions, with a jacket temperature of 83.4° C., and a stoichiometric ratio of 2.0 Stoich (i.e., supply of two times amount of $H_2$ required by fuel cell), the recirculated exhaust hydrogen fuel from the fuel cell's exhaust will possess a total enthalpy approximately equal to the desired total enthalpy of the inlet mixture of fresh and recirculated hydrogen to the fuel cell.

It will be understood that the above operating parameters are for example only, and that any number of combinations of operating conditions will enable the exploitation of the surplus anode exhaust energy, limited only by the pumping capacity of the eductors and the permissible operating temperature range of the fuel cell 12. By properly adjusting the temperature and stoichiometric ratio of the hydrogen stream to the anode inlet 18, moisture is retained in the hydrogen stream rather than condensing out in the fuel cell. This eliminates the need for adding moisture to the anode inlet stream, as well as eliminating the need for handling waste water condensed in the fuel cell 12.

Because the anode fuel stream is recirculated through the anode reservoir 92, which also serves as the deionized water reservoir for the cooling system (as described in greater detail below), the pressures of the anode fuel stream and the cooling water stream are automatically maintained in equilibrium, thereby preventing potential damage from pressure differentials between these two systems within the fuel cell. The anode hydrogen stream pressure, in turn, is preferably computer controlled by regulating means such as the reducing valve 84 and the digital regulator valve 85, to match the cathode air stream pressure discharged from the compressor 34. Thus, the pressures of all three systems are maintained in equilibrium, thereby reducing the potential for damage to the fuel cell.

The anode system 80 can further comprise a species transfer device 200 of the present invention in the form of a contaminant sweep. The contaminant sweep is yet another type of species transfer device, for example, a CO sweep, which removes a portion of the CO from the anode reactant stream to the PEM fuel cell 12, as CO is bad for certain catalysts in the fuel cell, including platinum. Thus, in this embodiment, the present stream conditioning system 200 can comprise an exchange media with a sorbent that is sized to remove CO from the anode reactant stream.

Cooling Water Management System

Deionized water can be used to cool the fuel cell 12, as standard water would cause the fuel cell to short. Deionized water, however, is highly corrosive and requires stainless steel equipment for its handing. Because stainless steel is a poor conductor of heat, providing a stainless steel radiator for rejecting the heat absorbed by the deionized cooling water from the fuel cell 12 to the ambient air would require a stainless steel radiator having a very large surface area. This large surface area would result in high aerodynamic drag on a fuel cell-powered vehicle, and would result in a very heavy and expensive radiator.

Moreover, because antifreeze agents cannot be added to deionized water, it is desirable to minimize the quantity of deionized water present in the fuel cell cooling system to simplify the required freeze protection.

The cooling water management system 130 of the fuel cell engine is shown schematically, in preferred form, by FIG. 3. The cooling water system 130 addresses the above-identified problems inherent in stainless steel handling systems for deionized cooling water by providing a "two-stage" cooling water system. This two-stage system preferably comprises two closed loops, namely a deionized water loop 132 and a standard water/glycol loop 134.

A brazed plate heat exchanger 136 provides water-to-water heat transfer between the deionized water loop 132 and the standard water loop 134 without permitting any mixing of the two loops. The brazed plate heat exchanger 136 is preferably provided in the supply line 138 of the deionized water loop 132 between the anode reservoir 92 and the deionized cooling water inlet 140 to the fuel cell 12. Deionized cooling water is discharged from the fuel cell 12 through a deionized cooling water discharge line 142 and returned to the anode reservoir 92. A deionized cooling water pump 144 circulates the deionized cooling water through the deionized water loop 132.

The standard water loop 134 circulates through the brazed plate heat exchanger 136 to absorb heat rejected from the deionized water loop 132. A standard cooling water pump 148 circulates standard cooling water, which can include an antifreeze agent such as ethylene glycol, through the standard water loop 134. A radiator 150 is preferably provided in the standard water loop 134 for rejecting heat to the ambient air.

The brazed plate heat exchanger 136 preferably comprises a stacked array of thin, stainless plates with deionized water and standard cooling water circulating in alternating layers between the thin, stainless plates. In this manner, heat is transferred from the deionized cooling water to the standard cooling water by forced water-to-metal-to-water convection and conduction through the thin stainless plates, thereby resulting in a much greater rate of heat transfer than could be obtained through the use of a stainless steel-to-air fin type radiator.

Once the heat has been transferred to the standard cooling water/glycol mix in the standard cooling water loop 134, non-stainless piping and equipment can be utilized for handling the cooling water and effecting water-to-air heat transfer. For example, a standard aluminum automotive radiator 150 can be utilized to reject heat from the standard cooling water loop 134 to the ambient air. Aluminum is cheaper and lighter than stainless, and provides a much higher heat transfer rate to air than does stainless. Also, aluminum automotive radiators are commercially available, thus eliminating the requirement for expensive custom manufacture. Thus, the cooling system enables the use of a smaller, lighter and less expensive radiator, requiring a smaller surface area and, therefore, less aerodynamic drag, than would be possible with stainless-to-air heat transfer. The provision of two separate cooling water loops 132, 134 also minimizes the quantity of deionized water necessary for fuel cell cooling and thereby reduces the potential for freezing. In addition, in preferred form, the fuel cell engine takes further advantage of the separate cooling water loops by consolidating the anode reservoir 92 and other deionized water handling piping and equipment in a thermally insulated and/or heated location to further minimize the likelihood of freezing.

In a preferred form, the deionized water pump 144 and the standard cooling water pump 138 comprise a double-ended pump driven by a single motor. A thermostat is preferably provided in the deionized water loop 132 or in the fuel cell cooling water jacket to maintain the desired stack exit temperature as required for anode humidity retention, as described above. The radiator 150 can further comprise a fan to assist in rejecting heat to the ambient air. A standard automotive cabin fan coil unit can also be provided for heating the cabin of a fuel cell powered vehicle.

During start-up, deionized cooling water discharged from the fuel cell 12 can be diverted through start-up conduit 146 and pumped, by means of the start-up pump 90 through the start-up eductor 88 to provide motive flow for the anode recirculation during start-up.

Having now described a preferred embodiment form of the present invention, one skilled in the art can see how the other embodiments of this invention described in the Summary above can be carried out.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A fuel cell engine stream conditioning system, the fuel cell engine stream conditioning system including a fuel cell, the stream conditioning system comprising:

(a) a species transfer device for conditioning streams of said fuel cell;
(b) a first stream of a fuel cell directed through the species transfer device; and
(c) a second stream of said fuel cell directed through the species transfer device;
the species transfer device capable of transferring a portion of a species from one of the first stream and the second stream to the other of the first stream and second stream.

2. The fuel cell engine stream conditioning system of claim 1, wherein the first stream has a higher potential of the species than the second stream, the species transfer device capable of transferring a portion of the species from the first stream to the second stream.

3. The fuel cell engine stream conditioning system of claim 1, wherein the first stream has a lower potential of the species than the second stream, the species transfer device capable of transferring a portion of the species from the second stream to the first stream.

4. The stream conditioning system of claim 1, wherein the species is latent heat.

5. The stream conditioning system of claim 1, wherein the species is sensible heat.

6. The fuel cell engine stream conditioning system of claim 1, wherein the first stream has a first potential of a first species and a second potential of a second species, wherein the second stream has a lower potential of the first species than the first stream and a higher potential of the second species than the first stream, the species transfer device capable of transferring a portion of the first species from the first stream to the second stream and a portion of the second species from the second stream to the first stream.

7. The fuel cell engine stream conditioning system of claim 1, wherein the species transfer device is an enthalpy transfer device.

8. The fuel cell engine stream conditioning system of claim 1, wherein the species transfer device is an enthalpy wheel.

9. The fuel cell engine stream conditioning stem of claim 1, wherein the species transfer device comprises more than one bed of species transfer material.

10. The fuel cell engine stream conditioning system of claim 1, wherein the species comprise latent heat and sensible heat, and wherein latent heat is transfer to the first stream and sensible heat is transferred to the second stream.

11. A fuel cell engine stream conditioning system, the fuel cell engine stream condition system include a fuel cell, the stream conditioning system comprising:
(a) a species transfer device for conditioning streams of said fuel cell;
(b) a first stream of said fuel cell directed through the species transfer device; and
(c) a second stream of said fuel cell directed through the species transfer device;
the species transfer device capable of transferring a portion of a species from one of the first stream and the second stream to the other of the first stream and second stream.

12. The stream conditioning system of claim 11, further comprising a third stream directed through the species transfer device, wherein the species transfer device is capable of transferring a portion of a species from the first stream and the second stream to the third stream.

13. The stream conditioning system of claim 11, wherein the species transfer device includes an exchange media having a sorbent.

14. The stream conditioning system of claim 13, wherein the species is latent heat.

15. The stream conditioning system of claim 13, wherein the species is sensible heat.

16. A fuel cell engine stream conditioning system, the fuel cell engine stream conditioning system including a fuel cell, the stream conditioning system comprising:
(a) a species transfer device for conditioning steams of said fuel cell said species transfer device including an exchange media having a sorbent;
(b) a first steam of said fuel cell directed through the exchange media; and
(c) a second stream of said fuel cell directed through the exchange media;
the species transfer device capable of transferring a portion of a species from one of the first stream and the second stream to the other of the first stream and second stream.

17. The stream conditioning system of claim 16, wherein the species is latent heat and the sorbent is a desiccant, a portion of the latent heat of the second stream being removed from the second stream and transferred to the first stream.

18. The stream conditioning system of claim 16, wherein the species is sensible heat, a portion of which is transferred from the stream having a higher potential of sensible heat to the stream having a lower potential of sensible heat.

19. The stream conditioning system of claim 16, wherein the first stream includes a reactant for a fuel cell of the fuel cell engine.

20. The stream conditioning system of claim 16, wherein the first stream includes fuel for the fuel cell of the fuel cell engine.

21. The stream conditioning system of claim 16, wherein the first stream includes an oxidant for the fuel cell of the fuel cell engine.

22. The stream conditioning system of claim 16, wherein the species is selected from the group consisting of latent heat, sensible heat, oxygen, hydrogen, nitrogen, carbon monoxide, carbon dioxide, sulfur dioxide and methanol.

23. The stream conditioning system of claim 16, wherein the fuel cell engine incorporates a reformer, and wherein one of the first and second streams is an outlet stream from the reformer.

24. The stream conditioning system of claim 17, wherein the desiccant is a zeolite.

25. The stream conditioning system of claim 18, wherein the species transfer device is an enthalpy transfer device.

26. A fuel cell engine stream conditioning system, the fuel cell engine stream conditioning system having a fuel cell, the stream conditioning system comprising:
(a) a species transfer device for conditioning streams of said fuel cell, said species transfer device incorporating an exchange media and a sorbent;
(b) a first steam of said fuel cell having a potential of a species, the first stream being a reactant for said fuel cell, the first stream directed through a transfer portion of the exchange media; and
(c) a second stream of said fuel cell having a lower potential of the species than the first stream, the second stream directed through the transfer portion of the exchange media; the species transfer device capable of transferring a portion of the species from the fist stream to the second stream;
the second stream directed through the transfer portion of the exchange media subsequent the first stream via rotation of the species transfer device.

27. The stream conditioning system of claim 26, wherein the first stream has a first potential of a first species and a second potential of a second species, wherein the second stream has a lower potential of the first species than the first stream and a higher potential of the second species than the first stream, the species transfer device capable of transferring a portion of the first species from the first stream to the second stream and a portion of the second species from the second stream to the first stream.

28. The stream conditioning system of claim 26, wherein the species transfer device is an enthalpy wheel.

29. The stream conditioning system of claim 28, wherein the enthalpy wheel incorporates a desiccant and a second sorbent, the enthalpy wheel capable of transferring both a portion of the first species from the first stream to the second stream, and a portion of the second species from the second stream to the first stream.

30. A fuel cell engine stream conditioning system, the fuel cell engine stream conditioning system having a fuel cell, the stream conditioning system comprising:
(a) a species transfer device for conditioning streams of said fuel cell, said species transfer device incorporating an exchange media and a sorbent;
(b) a first stream having a potential of a species, the first stream being a reactant for the fuel cell, the first stream directed through a transfer portion of the exchange media;
(c) a second stream having a potential of the species, the second stream being a reactant for the fuel cell, the second stream directed through the transfer portion of the exchange media; and
(d) a third stream having a lower potential of the species than either the first and second streams, the third stream directed through the transfer portion of the exchange media; the species transfer device capable of transferring a portion of the species from the first and second streams to the third stream;
the second stream directed through the transfer portion of the exchange media subsequent the first stream, and the third steam directed through the transfer portion of the exchange media subsequent the second stream, via rotation of the species transfer device.

31. A fuel cell engine stream condition system, the fuel cell engine stream conditioning system having a fuel cell, the stream conditioning system for conditioning a stream of reactant supplied to die fuel cell, the system comprising;
a enthalpy wheel for conditioning an exhaust stream and an inlet stream of said fuel cell by collecting latent heat from the exhaust stream and transferring the latent heat to the inlet stream;
the exhaust steam directed through the enthalpy wheel at an exhaust zone and the inlet stream directed through the enthalpy wheel at an inlet supply zone.

32. The system of claim 31, wherein the enthalpy wheel is designed to rotate at a speed of rotation through the exhaust zone and the supply zone.

33. The system of claim 31, wherein the fuel cell is a proton exchange membrane fuel cell, and wherein the reactant includes air supplied to the fuel cell.

34. The system of claim 31, wherein the fuel cell is a direct methanol fuel cell, and wherein the exhaust stream of the reactant includes methanol.

35. A fuel cell engine stream conditioning system, the fuel cell engine stream conditioning system having a fuel cell, the stream conditioning system for conditioning a stream of reactant supplied to the fuel cell, the system comprising:

an enthalpy wheel for conditioning an exhaust stream and an inlet stream of said fuel cell by collecting sensible heat from the exhaust stream and transferring the sensible heat to the inlet stream;
the exhaust stream directed through the enthalpy wheel at an exhaust zone and the inlet stream directed through the enthalpy wheel at an inlet supply zone.

36. The system of claim 35, wherein the enthalpy wheel is designed to rotate at a speed of rotation through the exhaust zone and the supply zone.

37. The system of claim 35, wherein the fuel cell is a proton exchange membrane fuel cell, and wherein the reactant includes air supplied to the fuel cell.

38. The system of claim 35, wherein the fuel cell is a direct methanol fuel cell, and wherein the exhaust stream of the reactant includes methanol.

39. A fuel cell engine stream conditioning system, the fuel cell engine stream conditioning system having a fuel cell, the stream conditioning system for conditioning a stream of reactant supplied to the fuel cell, the system comprising:
an enthalpy wheel for conditioning inlet and exhaust streams of said fuel cell by transferring sensible heat from one stream to the other;
the exhaust stream directed through the enthalpy wheel at an exhaust zone and the inlet stream directed through the enthalpy wheel at an inlet supply zone.

40. The system of claim 39, wherein the enthalpy wheel is designed to rotate at a speed of rotation through the exhaust zone and the supply zone.

41. The system of claim 39, wherein the fuel cell is a proton exchange membrane fuel cell, and wherein the reactant includes air supplied to the fuel cell.

42. The system of claim 39, wherein the fuel cell is a direct methanol fuel cell, and wherein the exhaust stream of the reactant includes methanol.

43. A system for conditioning a stream of reactant supplied to a fuel cell, the system conditioning a stream of reactant having a fuel cell, the system comprising:
enthalpy transfer device for conditioning inlet and exhaust streams of a fuel cell by collecting latent heat from the exhaust stream, the latent heat being in the form of water vapor collected from the reactant exhaust stream, the enthalpy transfer device further capable of transferring the latent heat to the inlet stream, the latent heat being transferred to the inlet stream by transferring the water collected from the exhaust stream to the inlet steam.

44. A method of conditioning a reactant to a fuel cell, the fuel cell having a reactant inlet and a reactant exhaust, the method comprising the steps:
(a) collecting moisture from the reactant exhaust of a fuel cell using an enthalpy transfer device; and
(b) transferring at least a portion of the collected moisture from the enthalpy transfer device to the reactant inlet of a fuel cell.

45. The method of conditioning a reactant to a fuel cell according to claim 44, wherein the enthalpy transfer device incorporates an exchange media having a desiccant.

46. The method of conditioning a reactant to a fuel cell according to claim 45, wherein the desiccant is a zeolite.

47. A method for conditioning a stream of reactant supplied to a fuel cell, comprising the steps of:
(a) collecting an exhaust stream of the reactant from the fuel cell;
(b) supplying an inlet stream of the reactant to the fuel cell;

(c) collecting latent heat from the reactant exhaust, the latent heat being in the form of water vapor collected from the reactant exhaust stream of the fuel cell, and transferring The latent heat to the reactant inlet stream of the fuel cell, the latent heat being transferred to the reactant inlet stream of the fuel cell by transferring the water collected from the reactant exhaust stream to the reactant inlet stream.

* * * * *